(12) United States Patent
Jansson et al.

(10) Patent No.: US 8,487,201 B2
(45) Date of Patent: Jul. 16, 2013

(54) CONTACT ELEMENT AND A CONTACT ARRANGEMENT

(75) Inventors: Ulf Jansson, Uppsala (SE); Erik Lewin, Uppsala (SE)

(73) Assignees: ABB Research Ltd., Zürich (CH); Impact Coatings AB, Linkoping (SE)

( * ) Notice: Subject to any disclaimer, the term of this patent is extended or adjusted under 35 U.S.C. 154(b) by 332 days.

(21) Appl. No.: 12/809,673

(22) PCT Filed: May 14, 2008

(86) PCT No.: PCT/EP2008/055885
§ 371 (c)(1),
(2), (4) Date: Sep. 16, 2010

(87) PCT Pub. No.: WO2009/080375
PCT Pub. Date: Jul. 2, 2009

(65) Prior Publication Data
US 2011/0000770 A1    Jan. 6, 2011

Related U.S. Application Data

(60) Provisional application No. 61/008,289, filed on Dec. 20, 2007.

(30) Foreign Application Priority Data

Mar. 31, 2008    (WO) .................. PCT/EP2008/053822
Mar. 31, 2008    (WO) .................. PCT/EP2008/053830

(51) Int. Cl.
*H01H 1/02*    (2006.01)

(52) U.S. Cl.
USPC .......................................... 200/270; 200/262

(58) Field of Classification Search
USPC .................................. 200/270, 262, 265–269
See application file for complete search history.

(56) References Cited

U.S. PATENT DOCUMENTS 5,786,068 A * 7/1998 Dorfman et al. .............. 428/209
7,344,760 B1 * 3/2008 Heffner et al. ................ 427/523
(Continued)

FOREIGN PATENT DOCUMENTS
EP          1712522 A    10/2006
JP       2004253229 A     9/2004
(Continued)

OTHER PUBLICATIONS

PCT/ISA/210—International Search Report—Feb. 16, 2009.
(Continued)

*Primary Examiner* — Xuong Chung Trans
(74) *Attorney, Agent, or Firm* — Venable LLP; Eric J. Franklin

(57) ABSTRACT

A contact element for making an electric contact to a contact member for enabling an electric current to flow between the contact element and the contact member. The contact element includes a body having at least one contact surface thereof coated with a contact layer to be applied against the contact member. The contact layer includes a nanocomposite film having a matrix and crystallites of nano-size embedded therein. Portions of the matrix separating adjacent the crystallites of the nanocomposite film have a thickness providing the matrix and hence the film with an electrical conductivity determined by a substantially two-dimensional character of the matrix.

27 Claims, 3 Drawing Sheets

U.S. PATENT DOCUMENTS

| | | | | |
|---|---|---|---|---|
| 7,709,759 | B2* | 5/2010 | Lewin et al. | 200/270 |
| 7,786,393 | B2* | 8/2010 | Isberg et al. | 200/262 |
| 7,934,962 | B2* | 5/2011 | Hirano et al. | 439/886 |

FOREIGN PATENT DOCUMENTS

| | | |
|---|---|---|
| WO | WO-01/41167 A2 | 6/2001 |
| WO | WO-2005/038985 A2 | 4/2005 |
| WO | WO-2007/011276 A | 1/2007 |
| WO | WO-2008/068351 A | 6/2008 |

OTHER PUBLICATIONS

PCT/ISA/237—Written Opinion of the International Searching Authority—Feb. 16, 2009.

A.K. Geim and K.S.Novoselov; The rise of graphene; Nature Materials; vol. 6; Mar. 2007; pp. 183-191.

K.S. Novoselov et al.; "Electric Field Effect in Atomically Thin Carbon Films"; vol. 306; Oct. 22, 2004; pp. 666-669.

Nils Nedfors et al.; "Structural, mechanical and electrical-contact properties of nanocrystalline-NbC/amorphous-C coatings deposited by magnetron sputtering" Surface & Coatings Technology 206; 2011; pp. 354-359.

Martin Magnuson et al.; "Electronic structure and chemical bonding of amorphous chromium carbide thin films"; Journal of Physics Condensed Matter 24; 2012; pp. 225004-225010 (7pp).

* cited by examiner

CONTACT ELEMENT AND A CONTACT ARRANGEMENT

CROSS-REFERENCE TO RELATED APPLICATIONS

This application claims priority to U.S. provisional patent application 61/008,289 filed 20 Dec. 2007, PCT/EP2008/053822 filed 31 Mar. 2008, and PCT/EP2008/053830 filed 31 Mar. 2008 and is the national phase under 35 U.S.C. §371 of PCT/EP2008/055885 filed 14 May 2008.

FIELD OF THE INVENTION AND PRIOR ART

The present invention relates to a contact element for making an electric contact to a contact member for enabling an electric current to flow between said contact element and said contact member, said contact element comprising a body having at least one contact surface thereof coated with a contact layer to be applied against said contact member, as well as a sliding electric contact arrangement, i.e. a contact arrangement in which two contact surfaces adapted to be applied against each other for establishing an electric contact may slide with respect to each other when establishing and/or interrupting and/or maintaining the contact action.

Such a contact element may have many different applications, in which said contact layer is arranged for establishing an electric contact to a contact member with desired properties, such as a low contact resistance, high conductivity, a high resistance to wear and a low friction coefficient with respect to the material of the contact member to be contacted etc. Such applications are for instance for making contacts for electrical devices on a wafer of one or more such devices, for establishing and interrupting an electric contact in mechanical disconnectors, contacts on printed circuit cards, pin contacts and breakers and for establishing and interrupting electric contacts in contact arrangements of plug-in type. Such electric contact elements, which may establish sliding contacts or stationary contacts, have preferably a metallic body made of for instance copper, aluminium, nickel or stainless steel. It is known to coat said body with a contact layer of metal for protecting contact surfaces of the contact element against wear and corrosion. However, it has turned out that the metals used until now for such a contact layer have shown a tendency to adhere to the surface on the contact member bearing there-against, which may result in damaging the surface near portions of the contact element and/or contact member, when traction forces attempt to move the contact element with respect to the contact member, for instance as a consequence of a difference in coefficient of thermal expansion of the material of the contact element and that of the contact member upon temperature changes or when the contact element and the contact member are to be moved with respect to each other in a sliding contact. This problem has been solved by lubricating the contact surfaces of the contact element and the contact member with a lubricant. Such a lubricant may have an oil or a fat as base, but solid lubricants, such as graphite, also exist. However, solid lubricants have a poor electric conductivity and are often worn away when the contact surfaces are sliding against each other.

WO 01/41167 discloses a solution to these problems by designing said contact layer as a continuous film comprising a laminated multi element material.

EP 1685626 discloses a solution to these problems by providing a contact element with a contact layer comprising a MAX-phase material.

WO 07/011,276 discloses a solution to these problems by providing a contact element with a nanocomposite film, comprising an amorphous carbon matrix and crystallites of nano-size.

However, there is a constant desire and need of said contact elements being improved with respect to contact elements known in several aspects, such as having a lower contact resistance, higher conductivity and/or a higher resistance to wear and thereby an increased life span.

SUMMARY OF THE INVENTION

The object of the present invention is to provide an electric contact element being improved with respect to contact elements already known by at least partially addressing said need.

This object is according to the invention obtained by providing a contact element of the type defined in the introduction, in which said contact layer comprises a nanocomposite film having a matrix and crystallites of nano-size, i.e. here defined as being in the dimension range of 1-200 nm, embedded therein. Portions of said matrix separating adjacent said crystallites of said nanocomposite film have a thickness providing said matrix and hence said film with an electrical conductivity determined by a substantially two-dimensional character of said matrix, such as for so-called pseudo-2D materials like graphene.

Pseudo-2D materials are a novel type of materials which have been thoroughly investigated over the last few years. The most widely investigated is graphene (see for instance: "The rise of graphene", A. K. Geim and K. S. Novoselov, Nature Materials, vol. 6 (2007) pp. 183-191), which is a material ideally consisting of a single layer of graphite. These pseudo-2D materials have superior electrical conductivity, almost reaching superconductivity.

By providing for a nanocomposite comprising crystallites of nano-size embedded in a matrix, where said matrix separating adjacent said crystallites by only a few atomic layers of matrix, thus creating a network of pseudo-2D material with crystallites of nano-size embedded therein, it has surprisingly been seen that the contact resistance of said nanocomposite significantly decreases.

"Matrix" is in this disclosure to be interpreted to not only relate to a continuous majority phase in which said crystallites of nano-size are contained. The matrix may only consist of a few atomic layers around said crystallites of nano-size. The matrix is not only to be interpreted as a binding phase, but also as a phase significantly contributing to the electric conductivity and/or the contact resistance of the nanocomposite.

According to an embodiment of the invention the thickness of the matrix between the majorities of said adjacent crystallites does not exceed 10, 7, 5, 3, 2 or 1 atomic or molecular layer/layers. The significant decrease in contact resistance, associated with the pseudo-2D character of the matrix, is only achieved when the matrix between the adjacent crystallites is thin enough. When increasing the thickness the contact resistance is rapidly increasing.

According to another embodiment of the invention said matrix comprises a material which has a sheet-like structure on the molecular level, such as graphene sheets in graphite and corresponding sheets in hexagonal BN. It has been shown that the effect of high electrical conductivity in pseudo-2D materials is associated with the hybridization of the atoms included in the material. The high conductivity can be reached if the pseudo-2D materials have a high content of sp2 hybridized atoms, which is the case of sheet-like structures on the molecular level, e.g. almost one hundred percent of the C atoms in pure graphite are sp2 hybridized. The high conductivity discussed above may also be reached if the atoms in the matrix material are partly or fully sp3 hybridized, as long as the matrix separating adjacent crystallites is sufficiently thin.

According to another embodiment of the invention said matrix consists of carbon, boron, silicon, carbides, nitrides, borides or silicides, preferably carbon. In the field of "nanotube research", where the carbon nanotubes were the first to be explored, a wide range of new materials, showing similar properties, have been discovered. In analogy to the field of nanotubes, similar discoveries are to be expected for the field of pseudo-2D materials. Graphene was the first pseudo-2D material explored and in the backwater of that discovery a wide range of materials has been investigated, and there are doubtless more materials to come showing similar properties. The above mentioned materials can show the desired sp2 hybridization, mentioned above, if prepared correctly.

According to another embodiment of the invention the structure of said matrix comprises defects, such as point defects, extended defects or dislocation defects. Defects in a structure can enhance the electric conductivity and/or affect the mechanical properties positively, e.g. strengthen the material.

According to another embodiment of the invention said defects comprise at least one doping agent. Doping agents are known in the art to affect the electric conductivity of a material. By choosing one or several proper doping agents the electric conductivity of said matrix can be further increased.

According to another embodiment of the invention said doping agent is a transition metal or a p-element, preferably Fe, Co, Ni, Ag, Ta, F, H or O, more preferred Ni. Said doping agents may provide a significant increase in the electric conductivity of said matrix.

According to another embodiment of the invention said crystallites consist of a metal, metal alloy, metal carbide, metal nitride, metal boride or metal silicide, preferably a metal carbide or a metal nitride. Properties additional to high electrical conductivity and/or contact resistance can be tailored by the embedded crystallites. If e.g. corrosion resistance is demanded by the nanocomposite film, crystallites showing good corrosion resistance is embedded in said matrix, and if e.g. a hard nanocomposite film is required of a certain contact arrangement, hard crystallites, consisting of e.g. metal carbide or metal nitride, is chosen correspondingly.

According to another embodiment of the invention said crystallites consist of niobium carbide or titanium carbide. These two materials provide the nanocomposite film with high wear resistance. Niobium carbide and titanium carbide are also highly electrical conductive, which further increases the electrical conductivity of the nanocomposite film.

According to another embodiment of the invention said crystallites have a diameter-like dimension in the range of 1-200, 30-70, 50-200, 100-150 or 5-50 nm. If the crystallites are too large the composite will assume the bulk properties of the material of the crystallites. Furthermore, the thickness of the matrix between the adjacent said crystallites is dependent upon the sizes of the crystallites. If the crystallites are too large, it is impossible to achieve a thin matrix between said adjacent crystallites.

According to another embodiment of the invention the thickness of said film is in the range of 0.05-2, 0.05-5, 0.05-10, 1-5 or 2-10 µm, which is suitable for most applications.

According to another embodiment of the invention said film is deposited on said body by the use of a vapour deposition technique, which may be Physical Vapour Deposition (PVD) or Chemical Vapour Deposition (CVD). The film may also be formed on said body by the use of a solution method, such as sol-gel.

Another object of the present invention is to provide an electric contact arrangement allowing for contact between two, contact surfaces while providing a high conductivity in said contact arrangement.

Another object of the present invention is to provide a sliding electric contact arrangement of the type defined in the introduction allowing a movement of two contact surfaces applied against each other while reducing the inconveniences discussed above to a large extent.

The basic features and advantages of such a contact arrangement are associated with the characteristics of the contact element according to the present invention and appear from the discussion above, of such a contact element. However, it is pointed out that "sliding electric contact" includes all types of arrangements making an electric contact between two members, which may move with respect to each other when the contact is established and/or interrupted and/or when the contact action is maintained. Accordingly, it includes not only contacts sliding along each other by action of an actuating member, but also so-called stationary contacts having two contact elements pressed against each other and moving with respect to each other in the contacting state as a consequence of magneto-striction, mechanical vibrations, external vibrations, thermal cycling and materials of the contact elements with different coefficients of thermal expansion or temperature differences between different parts of the contact elements varying over the time.

According to an embodiment of the present invention the contact element and the contact member are adapted to be pressed towards each other for establishing said contact, and the arrangement may comprise means for spring-loading the contact element and the contact member against each other for making said electric contact.

Further advantages as well as advantageous features of the invention appear from the following description and the other dependent claims.

BRIEF DESCRIPTION OF THE DRAWINGS

With reference to the appended drawings, below follows a specific description of embodiments of the invention cited as examples.

In the drawing.

DETAILED DESCRIPTION OF PREFERRED EMBODIMENTS OF THE INVENTION

Figure 1:
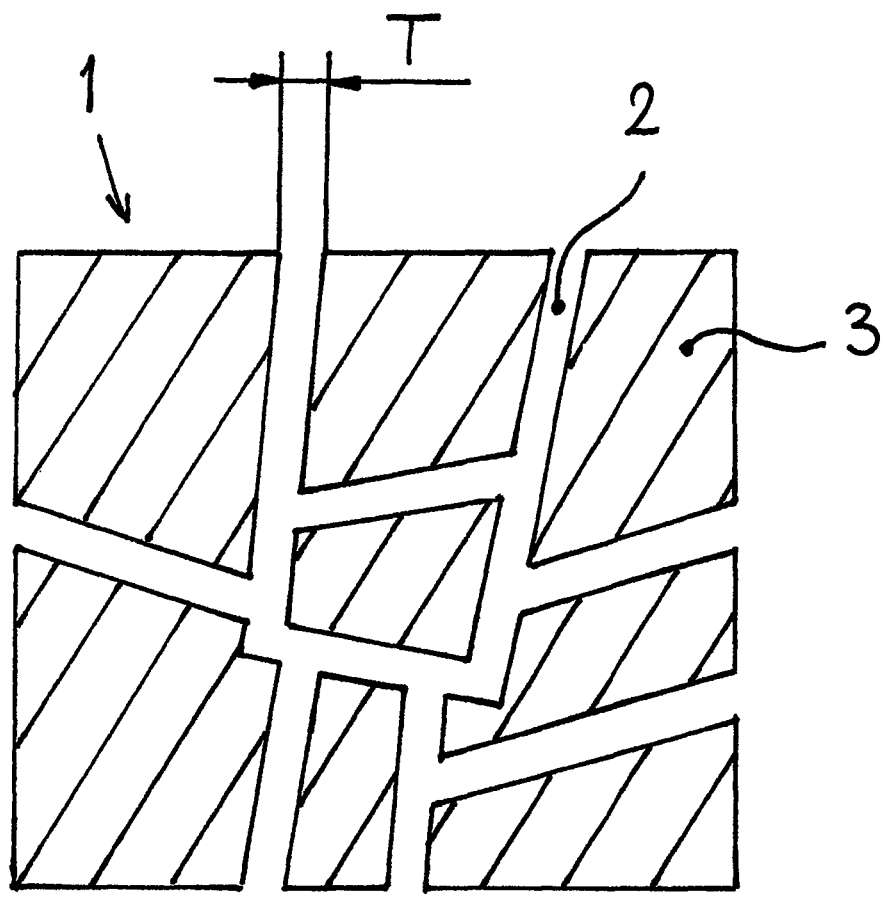
FIG. 1 illustrates very schematically a nanocomposite according to the invention.

A nanocomposite 1 according to the invention is very schematically shown in FIG. 1. Said nanocomposite 1 comprises a matrix 2 and crystallites 3 of nano-size, i.e. here defined as being in the dimension range of 1-200 nm embedded therein. Said crystallites 3 are separated by said matrix 2, having a thickness T between adjacent said crystallites 3 not exceeding 10, 7, 5, 3, 2 or 1 atomic or molecular layer/layers. The matrix 2 comprises a material which has a sheet-like structure on the molecular level, such as graphite and hexagonal BN, and said crystallites 3 consist of a metal, metal alloy, metal carbide, metal nitride, metal boride or metal silicide, preferably a metal carbide or a metal nitride.

Figure 2:
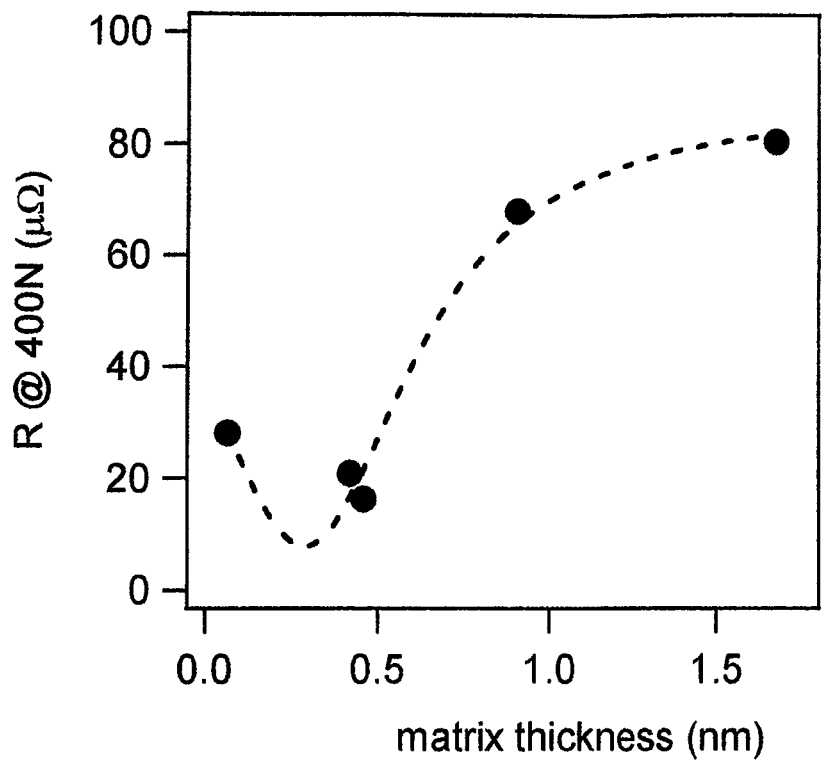
FIG. 2 shows a graph where the contact resistance is plotted versus the matrix thickness of a film according to the invention.

FIG. 2 shows a graph where the contact resistance is plotted versus the matrix 2 thickness T of a nanocomposite film according to the invention, such as a film comprising the nanocomposite in FIG. 1, in this exemplifying embodiment the matrix 2 consists of C, and the crystallites 3 consist of nano-crystalline TiC. It should be noted that the data on the thickness T of the matrix 2 should be interpreted as a rough average, the average thickness T of the matrix 2 between adjacent crystallites 3 was calculated from X-ray diffraction and XPS data, and supported by transmission electron microscopy images. As can be seen in the graph of FIG. 2, the contact resistance significantly decreases when the matrix thickness T reaches a thickness corresponding to about two atomic layers of graphite (~0.3 nm). The graph also indicates that the resistance starts to increase again when the thickness T of said matrix 2 between adjacent crystallites 3 nears zero. The low contact resistance shown in FIG. 2, corresponding to a thickness T of the matrix 2 of about two atomic layers of C has never been achieved earlier in similar nanocomposites. Similar contact resistance behaviour is to be expected when changing the matrix 2 from being C, to being another material which has a sheet-like structure on the molecular level according to the above discussion. The crystallites 3 can also be changed to any other metal, metal alloy, metal carbide, metal nitride, metal boride or metal silicide, without departing from the basic ideas of the present invention.

Figure 3:
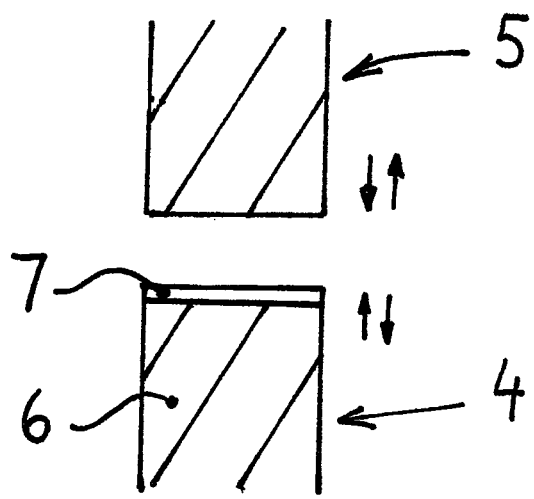
FIG. 3 illustrates very schematically an electric contact element according to an embodiment of the invention.

A contact element 4 forming an electric contact to a contact member 5 for enabling an electric current to flow between said contact element 4 and said contact member 5 is very schematically shown in FIG. 3. The contact element 4 comprises a body 6, which may consist of for instance aluminium or copper, and has at least one contact surface thereof coated with a contact layer 7 to be applied against said contact member 5. The contact layer 7 has typically a thickness of 0.05-2, 0.05-5, 0.05-10, 1-5 or 2-10 µm, so that the thickness shown in FIG. 3 is exaggerated with respect to other dimensions of the contact element 4 and the contact member 5 for illustrating purposes.

The contact layer 7 comprises a nanocomposite 1 according to the invention. This gives the contact layer 7 the excellent properties of e.g. low contact resistance reported above. Depending on the application of the contact element 4 the properties of the total contact structure can be optimized by changing the material in said crystallites 3. If e.g. corrosion resistance is demanded by the nanocomposite 1 film, crystallites 3 showing good corrosion resistance is embedded in said matrix 2, and if e.g. a hard nanocomposite 1 film is required of a certain contact arrangement, hard crystallites 3, consisting of e.g. metal carbide or metal nitride, is chosen correspondingly.

A contact layer 7 having the following advantages may thus be obtained:
a) a low contact resistance over a broad range of contact loads (forces)
b) high resistance to wear
d) high corrosion resistance
e) good high-temperature properties,
f) a large potential to various properties by tuning as described above.

Figure 4:
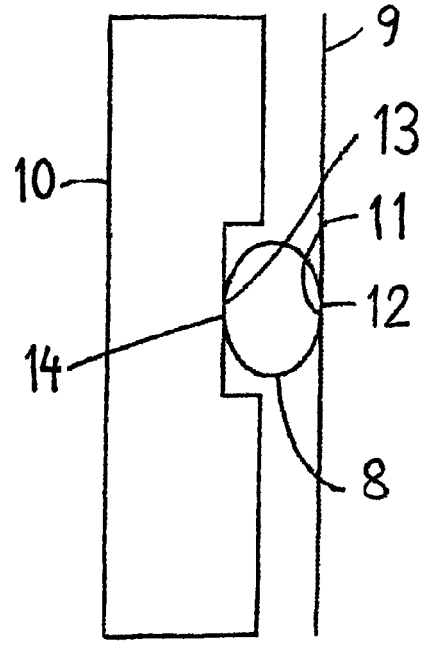
FIG. 4 is a sectioned view of an electric contact element of helical contact type according to an embodiment of the invention.

FIG. 4 illustrates an example of a contact arrangement in which it is advantageous to coat at least one of the contact surfaces with the contact layer according to the invention for forming a contact with very high electrical conductivity. This embodiment relates to a helical contact arrangement having a contact element 8 in the form of a spring-loaded annular body, such as a ring of a helically wound wire, adapted to establish and maintain an electric contact to a first contact member 9, such as an inner sleeve or a pin, and a second contact member 10, such as an outer sleeve or tube. The contact element 8 is in a contact state compressed so that at least a contact surface 11 thereof will bear springloadedly against the contact surface 12 of the first contact member 9 and at least another contact surface 13 of the first contact element 8 will bear spring-loadedly against at least a contact surface 14 of the second contact member 10. According to this embodiment of the invention at least one of the contact surfaces 11-14 is entirely or partially coated with a contact layer comprising a nanocomposite film according to the invention. Such a helical contact arrangement is used for example in an electrical breaker in a switch gear.

Figure 5:
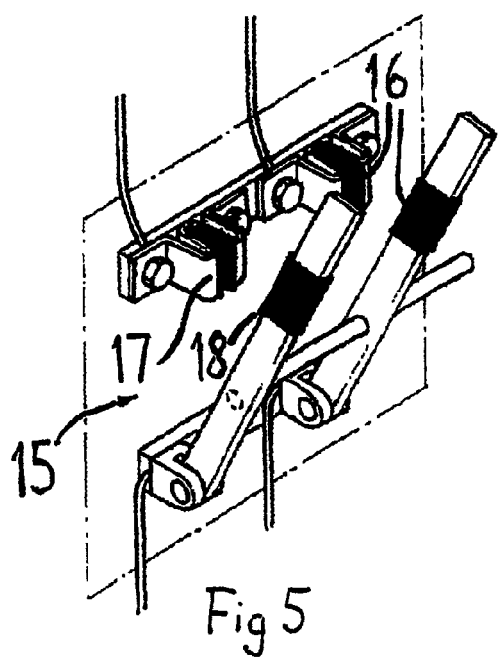
FIG. 5 illustrates very schematically a contact arrangement according to the present invention in a disconnector.

FIG. 5 illustrates very schematically how an electric contact arrangement according to the invention may be arranged in a disconnector 15 with a film 16 in the form of a nanocomposite according to the invention at least one of, the contact surfaces of two contact elements 17, 18 movable with respect to each other for establishing an electric contact therebetween and obtaining a visible disconnection of the contact elements.

Figure 6:
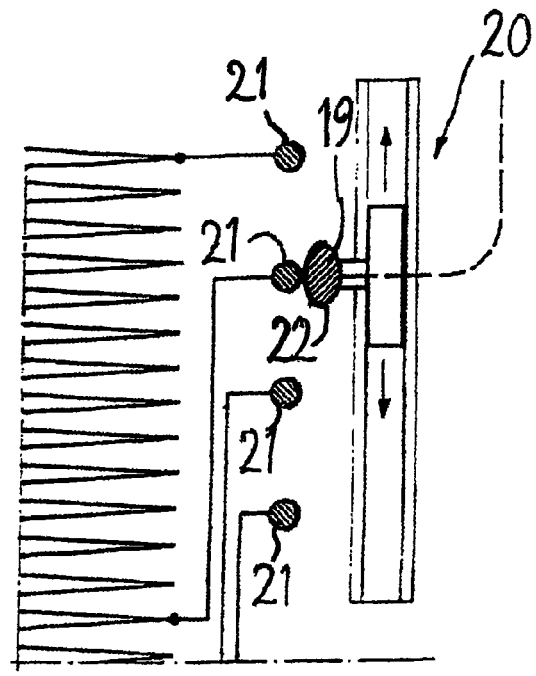
FIG. 6 illustrates very schematically a sliding contact arrangement in a tap changer of a transformer according to an embodiment of the invention.

FIG. 6 illustrates schematically a sliding electric contact arrangement according to another embodiment of the invention, in which the contact element 19 is a movable part of a tap changer 20 of a transformer adapted to slide in electric contact along contacts 21 to the secondary winding of the transformer, accordingly forming the contact member, for tapping voltage of a level desired from said transformer. A film 22 comprising a nanocomposite according to the invention is arranged on the contact surface of the contact element 19 and/or on the contact member 21. The contact element 19 may in this way be easily moved along the winding while maintaining a low resistance contact thereto.

Figure 7:
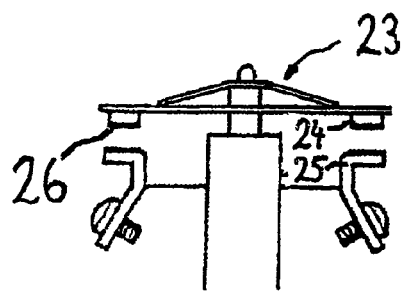
FIG. 7 illustrates very schematically a contact arrangement according to the present invention in a relay.

Finally, FIG. 7 illustrates very schematically a contact arrangement according to another embodiment of the invention used in a relay 23, and one or both of the contact surfaces of opposite contact elements 24, 25 may be provided with a film 26 according to the invention, which will result in less wear of the contact surface and make them corrosion resistant as a consequence of the character of said contact layer material.

A contact element and a sliding electric contact arrangement according to the present invention may find many other preferred applications, and such applications would be apparent to a person with ordinary skill in the art without departing from the basic idea of the invention as defined in the appended claims.

It is also pointed out that other transition metals than those mentioned above may be suited to form said metallic/ceramic crystallites of nano-size for meeting different demands put on the contact layer in different applications.

The invention claimed is:

1. A contact element for making an electric contact to a contact member for enabling an electric current to flow between said contact element and said contact member, said contact element comprising:
a body having at least one contact surface thereof coated with a contact layer to be applied against said contact member, said contact layer comprising a nanocomposite film having a matrix and crystallites of nano-size, embedded therein, wherein portions of said matrix separating adjacent said crystallites of said nanocomposite film have a thickness providing said matrix and hence said film with an electrical conductivity determined by a substantially two-dimensional character of said matrix, wherein said matrix has a thickness between a majority of adjacent said crystallites not exceeding 10, 7, 5, 3, 2 or 1 atomic or molecular layer/layers.

2. The contact element according to claim 1, wherein said matrix comprises a material which has a sheet-like structure on the molecular level.

3. The contact element according to claim 2, said matrix consists of carbon, boron, silicon, carbides, nitrides, borides or silicides, preferably carbon.

4. The contact element according to claim 1, wherein the structure of said matrix comprises defects.

5. The contact element according to claim 4, wherein said defects comprise at least one doping agent.

6. The contact element according to claim 5, wherein said doping agent is a transition metal or p-element.

7. The contact element according to claim 1, wherein said crystallites comprise a metal, metal alloy, metal carbide, metal nitride, metal boride or metal silicide.

8. The contact element according to claim 7, wherein said crystallites comprise niobium carbide or titanium carbide.

9. The contact element according to claim 1, wherein said crystallites have a diameter-like dimension in the range of 1-200, 30-70, 50-200, 100-150 or 5-50 nm.

10. The contact element according to claim 1, wherein the thickness of said film is in the range of 0.05-2, 0.05-5, 0.05-10, 1-5 or 2-10 μm.

11. The contact element according to claim 1, wherein said film is deposited on said body by the use of a vapour deposition technique.

12. The contact element according to claim 11, said film is deposited on said body by physical vapour deposition or chemical vapour deposition.

13. The contact element according to claim 1, wherein said film is formed on said body by a solution based deposition technique.

14. An electric contact arrangement, comprising:
a contact element comprising a body having at least one contact surface thereof coated with a contact layer to be applied against a contact member, said contact layer comprising a nanocomposite film having a matrix and crystallites of nano-size embedded therein, wherein portions of said matrix separating adjacent said crystallites of said nanocomposite film have a thickness providing said matrix and hence said film with an electrical conductivity determined by a substantially two-dimensional character of said matrix, wherein said film arranged to form a contact to a contact member, and wherein said matrix has a thickness between a majority of adjacent said crystallites not exceeding 10, 7, 5, 3, 2 or 1 atomic or molecular layer/layers.

15. The arrangement according to claim 14, wherein said contact arrangement is a sliding electric contact arrangement.

16. The arrangement according to claim 14, wherein said contact member has also a contact surface coated with said contact layer comprising said nanocomposite film.

17. The arrangement according to claim 15, wherein the surfaces of the contact element and the contact member adapted to be applied against each other for establishing said electric contact are allowed to move with respect to each other as a consequence of mechanical vibrations, external vibrations and different coefficients of thermal expansion of the materials of surface portions of the contact element and the contact member upon temperature changes of the contact element and the contact member.

18. The arrangement according to claim 17, wherein the contact element and the contact member are adapted to be pressed towards each other for establishing said contact.

19. The arrangement according to claim 15, further comprising:
a spring-loading element configured to spring load the contact element and the contact member against each other for making said electric contact.

20. The arrangement according to claim 15, wherein the arrangement is adapted to establish an electric contact in a tap changer for a transformer for making a contact to different winding turns of the transformer.

21. The arrangement according to claim 15, wherein the contact element and the contact member belong to two parts of a mechanical disconnector movable away from each other for disconnecting two terminals thereof.

22. The arrangement according to claim 15, wherein said contact element and said contact member belong to parts movable with respect to each other in a relay for establishing an electric contact therebetween when the relay operates.

23. The arrangement according to claim 15, wherein said contact arrangement is a sliding electric contact arrangement in which two contact surfaces adapted to be applied against each other for establishing an electric contact may slide with respect to each other when establishing and/or interrupting and/or maintaining the contact action.

24. The contact element according to claim 1, wherein the crystallites have a size with a dimension range of 1-200 nm.

25. The contact element according to claim 4, wherein the defects comprise point defects, extended defects or dislocation defects.

26. The contact element according to claim 6, wherein said doping agent is Fe, Co, Ni, Ag, Ta, F, H or O.

27. The contact element according to claim 13, wherein said film is formed on said body by a sol-gel technique.

* * * * *